Nov. 1, 1960  C. H. HULL  2,958,384
TRACTOR-IMPLEMENT COMBINATION WITH
WEIGHT TRANSFER ADJUSTMENT

Filed May 24, 1954  3 Sheets-Sheet 1

Inventor
Charles Hartley Hull
By
Attorneys

Inventor
Charles Hartley Hull
By Harris & Bateman
Attorneys

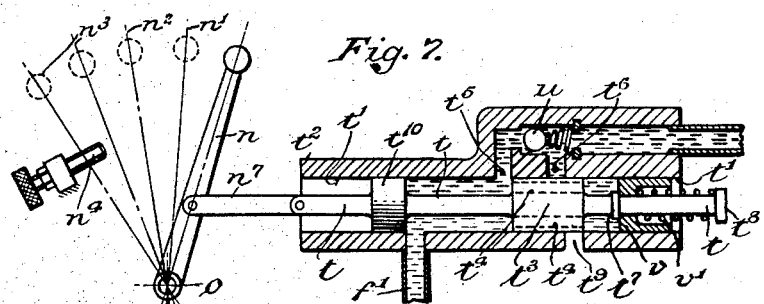
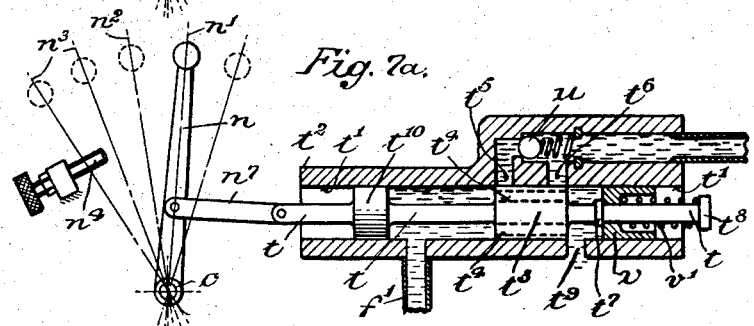
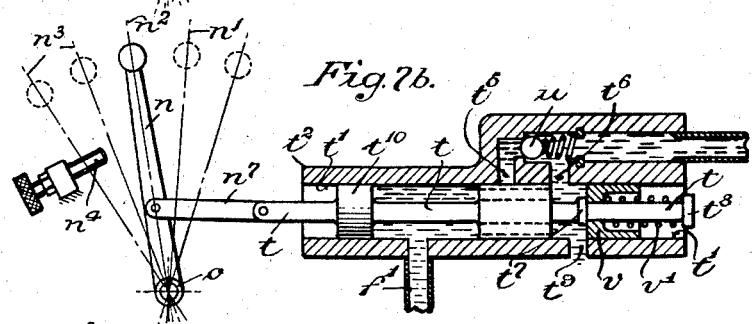
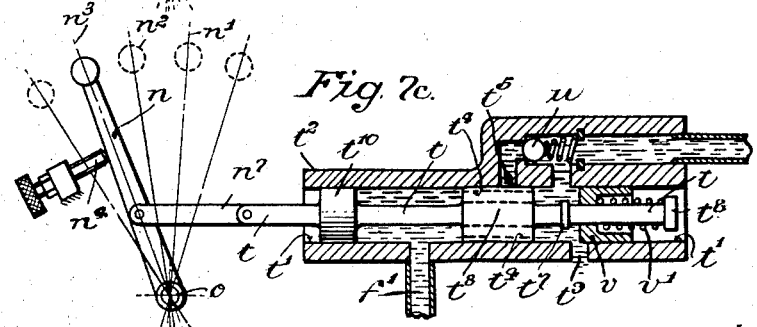

United States Patent Office 2,958,384
Patented Nov. 1, 1960

2,958,384

TRACTOR-IMPLEMENT COMBINATION WITH WEIGHT TRANSFER ADJUSTMENT

Charles H. Hull, Newsome, Huddersfield, England, assignor to David Brown Tractors (Engineering) Limited Filed May 24, 1954, Ser. No. 431,909

11 Claims. (Cl. 172—491)

The invention relates to tractor-implement combinations in which an implement, usually referred to as a "mounted" implement, is so connected to a tractor that it can be lowered into or raised from working position by hydraulic pressure means, operated by the tractor mechanism.

The invention has for its object to enable, in such a combination, when the working depth of the implement is controlled by a ground wheel or skid, the tractive effort of the tractor to be increased without resorting to the addition of ballast weights to the tractor.

The invention is characterised by the provision of means whereby a predetermined proportion of the weight of the implement can, at will, be caused to increase the downward force on the tractor rear wheels, without interfering with the ability of the implement to rise or fall under the guidance of its depth control wheel or skid as the latter follows the contour of the ground, and this is achieved by making provision whereby there can, at will, be applied to and automatically maintained behind the ram of a hydraulic cylinder, by which the vertical position of the implement is controllable, a back pressure which represents a suitable proportion, say between 30% and 90% of that required to raise the implement out of the soil when engaged therein.

To facilitate the understanding of the nature of the invention reference will first be made in the following description to Figs. 1 to 4 of the accompanying drawings, which illustrate respectively; (1) the load distribution between the front and rear wheels of a tractor without an implement hinged to it; (2) the load distribution when an implement, in this instance a plough, is close-hitched to the tractor and is in raised position, with the plough bodies clear of the ground; (3) the load distribution when the plough shown in Fig. 2 is in lowered operative position without application of weight-transfer means according to the invention; and (4) the load distribution when the plough is in lowered operative position and, by means according to the invention, a determined proportion of the weight of the plough has been utilised to increase the downward load on the tractor rear wheels.

Fig. 5 of the drawings illustrates diagrammatically an embodiment of the invention in which raising and lowering of an implement and transfer of weight to the tractor rear wheels are all effected by selective positioning of the same control lever.

Fig. 7 illustrates an arrangement in which the separate valves employed in the embodiments shown in Figs. 5 and 6 are combined in one and the same housing and the several operations are controllable by selective positioning of a single control lever. Figs. 7a, 7b, 7c illustrate different positions of the valve members in the arrangement shown at Fig. 7.

Figure 1:
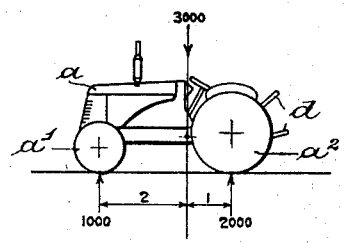

Referring firstly to Fig. 1, $a$ represents a tractor having front wheels $a^1$ and rear wheels $a^2$, and an assumed total weight represented by 3,000 units so distributed that there is (calculable by the principle of moments) a ground reaction of 1,000 units beneath the front axle, and of 2,000 units beneath the rear axle. Thus the load on the front axle is 1,000 units and that on the rear axle 2,000 units.

Figure 2:
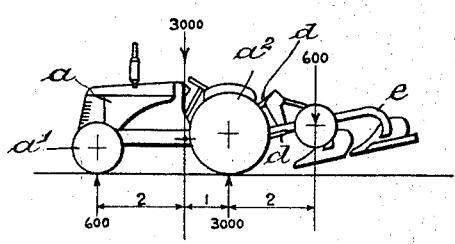

If, now, as in Fig. 2, there is mounted on the tractor, by means of the usual 3-link hitch $d$ comprising a pair of laterally spaced lower links and a centrally disposed upper link, an implement $e$ such as a plough having a weight of 600 units, and the implement is, as shown raised clear of the ground, the ground reactions, again calculated by the principle of moments, are: on the tractor front wheels 600 units, and on the rear wheels 3,000 units.

Figure 3:
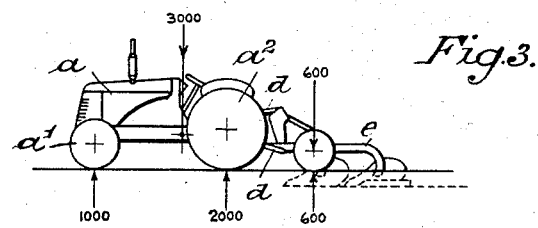

When, as in Fig. 3, the implement is lowered into working position in the soil, the ground reactions on the tractor front and rear wheels and hence the axle loads are the same as in Fig. 1, since the weight of the implement is wholly supported by the soil.

Figure 4:
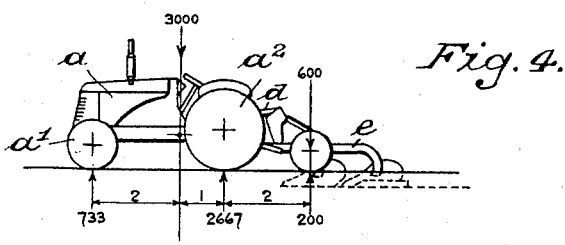

Fig. 4 shows the ground reactions when, by means according to the invention, two-thirds of the weight of the implement, i.e. 400 units are transferred to the tractor. The reactions are now: on the tractor front wheels 733 units; on the tractor rear wheels 2,667 units; and on the implement (due to hydraulic lift pressure) 200 units. It will thus be seen that the load on the tractor rear axle has been increased by 667 units, over and above the load due to normal ploughing, as shown in Fig. 3, and thereby the tractive effort exertible by the rear wheels proportionately increased.

Figure 5:
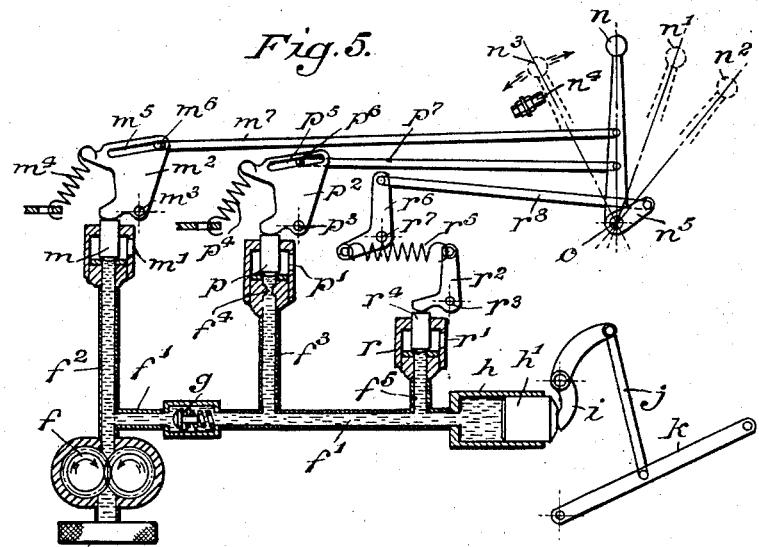

In Fig. 5 of the drawings, an arrangement is shown in which raising and lowering of the implement from and into operative position and transfer to the tractor rear wheels of the pre-determined portion of the weight of the implement are all controllable by a single pivoted lever. At $f$ there is shown a pump adapted to draw liquid from a suitable source of supply, not shown. The delivery side of the pump $f$ is connected by a conduit $f^1$, including a non-return valve $g$, to a hydraulic cylinder $h$ the ram $h^1$ of which is operative through pivoted levers such as $i$, lift rods such as $j$ and links such as $k$, to effect, by its movement outwardly along the cylinder $h$, raising of the implement, the link $k$ representing one of the usual two laterally spaced links of the hitch $d$ in Figs. 1–4. It will be noted that the non-return valve $g$ is openable in the direction of the cylinder $h$. The pipe connection $f^2$ connects the conduit $f^1$ to a bypass valve $m$, the outlet $m^1$ of which is connected to the source of liquid supply. A rocker member $m^2$ pivoted at $m^3$ is operative under the action of a spring $m^4$ to close the valve $m$. A slot $m^5$ in the rocker $m^2$ receives a pin $m^6$ on a rod $m^7$ connected to a control lever $n$ pivoted at $o$.

On the side of the non-return valve $g$ leading to the cylinder $h$ the conduit $f^1$ is connected by a pipe $f^3$ to a valve $p$ which, for reasons hereinafter appearing, is termed a drop valve. The outlet $p^1$ of the valve $p$ is connected to the source of liquid supply. A rocker member $p^2$ pivoted at $p^3$ is operative under the action of a spring $p^4$ to close the valve $p$. A slot $p^5$ in the rocker member $p^2$ receives a pin $p^6$ on a rod $p^7$ connected to the control lever $n$. The pipe connection $f^3$ includes, for a purpose hereinafter appearing, a restriction $f^4$ of predetermined cross-sectional area, though the pipe $f^3$ might itself of course, have a bore of the desired restricted cross-sectional area. Preferably, however, the pipe will be provided with a restriction which may be adjustable by any suitable means, not shown.

Between the pipe $f^3$ and the cylinder $h$ a pipe $f^5$ leads from the conduit $f^1$ to a valve $r$ termed a weight-transfer valve, the outlet $r^1$ of which leads to the source of liquid supply. An angle lever $r^2$ pivoted at $r^3$ bears with one of its arms on the closure member $r^4$ of the valve $r$ and the other arm of the lever $r^2$ is connected by a spring $r^5$ with one arm of an angle lever $r^6$ pivoted at $r^7$, the other arm of which lever is connected by a rod $r^8$ to a short arm $n^5$ on or fast with the control lever $n$.

The action of the embodiment shown in Fig. 5 is as follows:

In the position in which the parts are shown, the control lever is shown in full line in the position in which the bypass valve $m$, the drop valve $p$, and the weight-transfer valve $r$ are all held closed by their respective springs. Liquid delivered by the pump $f$ thus passes through the non-return valve $g$ to the hydraulic cylinder $h$ and forces the ram $h^1$ outwardly, thus rocking the lever $i$ and through the lift rods $j$ and links $k$ raising the implement clear of the ground. When, due to the implement reaching the limit of its lift, determined by a suitable stop, not shown, pressure builds up behind the ram $h^1$ beyond the determined value, the bypass valve $m$ is opened against the action of its spring $m^4$ and the liquid delivered by the pump passes back to the source of supply. Valve $m$ thus, in addition to acting as a bypass valve, acts also as a pressure relief valve.

If the control lever $n$ is moved to the position indicated in dotted lines at $n^1$, the bypass valve $m$ is opened by the rod $m^7$ whilst drop valve $p$ and weight-transfer valve $r$ remain closed. Liquid delivered by the pump $f$ thus passes freely through the valve $m$ and the implement is held in raised position.

Movement of the control lever $n$ to the position $n^2$ caused the bypass valve $m$ and drop valve $p$ to be opened whilst the weight-transfer valve $r$ remains closed. The liquid trapped between the non-return valve $g$ and the ram $h^1$ is now, under the weight of the implement, forced out through the drop valve and the implement is lowered, at a rate depending upon the area of the restriction $f^4$ in the pipe connection $f^3$.

The operations resulting from the movement so far described of the control lever $n$ represent the normal functioning of the hydraulic system in raising the implement to an inoperative position clear of the ground; holding it so raised; and lowering it into operative position.

If, due to the nature of the soil, the tractor rear wheels, when the implement is at work, are unable to obtain the requisite grip and commence to spin, the increased adhesion which it is the object of the invention to provide, is obtained by moving the control lever $n$ from the position $n^2$, to the position $n^3$. In this position the bypass valve $m$ and drop valve $p$ are held closed by their respective springs. Liquid delivered by the pump thus passes through the non-return valve $g$ and causes pressure to begin to build up behind the ram $h^1$. When this pressure reaches the pre-determined value which, as stated previously, is less than that required to lift the implement out of the soil, the spring $r^5$, the action of which has, by movement of the control lever to the $n^3$ position, become reduced to a point at which it will yield under the pre-set pressure, permits the valve $r$ to open and the liquid delivered by the pump to pass through outlet $r^1$ back to the source of supply. There is thus maintained behind the ram $h^1$ a pressure representing a pre-determined portion of the weight of the implement and, as shown in Fig. 4, this weight is caused to increase the downward load upon, and thus the adhesion of, the tractor rear wheels. The position $n^3$ to which the lever $n$ is movable is determined by an adjustable stop $n^4$.

Figure 6:
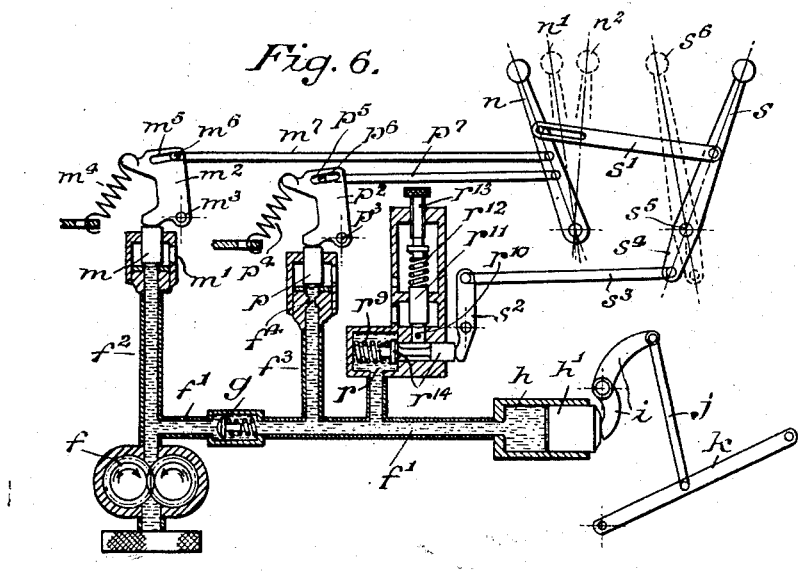
Fig. 6 illustrates an arrangement in which weight transfer is effected by movement of a separate control lever which is in operative connection with a control lever for effecting raising and lowering of the implement.

The arrangement shown in Fig. 6 is generally similar to that of Fig. 5 with the exceptions that operation of the weight-transfer valve $r^{11}$ to transfer part of the weight of the implement to the tractor rear wheels is controlled by a separate pivotted lever $s$ connected to the lever $n$ by a slotted link $s^1$, and that the valve $r^{11}$ is shown as incorporating manually adjustable means by which the amount of weight transfer can be varied. In this arrangement the lever $n$ controls the raising of the implement; the holding of it raised; and the lowering of it into operative position, independently of the lever $s$ when the latter is in the "off" position, this being permitted by the slot in the link $s^1$. The actuating valve $r^{14}$ is, in this arrangement, closed by a spring $r^9$ and openable by a pivotted lever $s^2$ one arm of which bears against the valve $r^{14}$ whilst the other is connected by the link $s^3$ with an extension $s^4$ beyond the pivot $s^5$ of the lever $s$. A passage $r^{10}$ leading from the chamber in which the valve member $r^{14}$ works is normally held closed by weight transfer valve $r^{11}$ against the spring $r^{12}$ the action of which is adjustable by a manually operable screw $r^{13}$. In this arrangement, movement of the lever $s$ to a position $s^6$ (determinable by an appropriately located stop not shown) causes the lever $n$ to be moved to the position shown in full lines in which the bypass valve $m$ and drop valve $p$ are closed. Simultaneously the lever $s^2$ opens the actuating valve $r^{14}$ and permits liquid to act upon the weight transfer valve $r^{11}$. When the pre-determined pressure has built up behind the valve $r^{11}$, corresponding to the proportion of weight of the implement it is desired to transfer to the tractor rear wheels, the said valve opens and the liquid delivered by the pump passes through the outlet $r^1$ to the source of supply.

In the arrangement shown in Fig. 7, in which equivalents of valves $m$, $p$, $r$ and $r^{11}$ of Figures 5 and 6 are combined in a single unit, the control lever $n$ is connected by a link $n^7$ to rod $t$ slidable longitudinally in a bore $t^1$ in a casing $t^2$. The delivery conduit $f^1$ from the pump $f$ opens into the bore $t^1$ between a piston member $t^{10}$ fast on the rod $t$ and a valve member $t^3$ also fast on the rod $t$ and provided with longitudinal port $t^4$. A port $t^5$ leads from the bore $t^1$ through a non-return valve $u$ openable towards the hydraulic cylinder $h$. Another port $t^6$ leads from the bore $t^1$ to the hydraulic cylinder and is disposed on the cylinder side of the non-return valve $u$. Weight-transfer valve member $v$ slidable on the rod $t$ is adapted to be held against a shoulder $t^7$ on the rod by a spring $v^1$ confined between the said valve member $t$ and a collar $t^8$ fast on the rod $t$. A return port $t^9$ connects the bore $t^1$ with the source of liquid supply.

In the position of the lever $n$ shown in Fig. 7, the valve member $t^3$ on the rod $t$ is positioned to close the port $t^6$ leading to the hydraulic cylinder $h$ and also to close the return port $t^9$. Liquid delivered by the pump $f$ thus passes to the hydraulic cylinder $h$ by way of the port $t^5$ and non-return valve $u$ and moves the ram $h^1$ to effect raising of the implement clear of the ground. The conduit between the pump and the bore $t^1$ will include a suitable pressure relief valve designed to open when, after the implement has reached its top position, undue pressure begins to build up behind the ram $h^1$.

In the position $n^1$ of the lever $n$ shown in Fig. 7a, the ports $t^5$ and $t^6$ are both closed by the valve member $t^3$ thus preventing any return of liquid from the hydraulic cylinder and holding the implement in raised position. Liquid delivered from the pump passes through the ports $t^4$ in the valve member $t^3$ and back to the source of supply through the return port $t^9$.

In the position $n^2$ of the lever $n$ shown in Fig. 7b, the port $t^5$ is held closed and the port $t^6$ is opened. Liquid can thus return from the hydraulic cylinder and, along with that delivered by the pump, pass back to the source of supply through the return port $t^9$, the implement thus being lowered to working position. The rate at which the implement is lowered can be regulated by providing means to determine adjustably the extent to which the lever $n$ in the "drop" position opens the port $t^6$.

On movement of the lever $n$ to the position $n^3$ shown in Fig. 7c the port $t^5$ is closed, the port $t^6$ is opened and the return port $t^9$ is at first obstructed by the weight-transfer valve member $v$. The liquid delivered by the pump passes through the ports $t^4$ and when pressure is built up behind the ram $h^1$ of the hydraulic cylinder $h$ to an amount determined by the proportion of weight of the implement it is desired to transfer to the tractor rear wheels, the valve member $v$ is forced back against the action of its spring $v^1$, thus permitting of escape through the return port $t^9$ of the liquid delivered by the pump. The setting of the adjustable stop $n^4$ determines the weight transfer position to which the lever $n$ can be moved, and it thus regulates the amount by which the valve member $v$ may obstruct the return port on movement of the lever to contact the stop.

Whilst the three embodiments of the invention shown and described are good and practicable, it will be obvious that they are not exhaustive of the ways in which the invention can be carried into practice and that other and equivalent valve arrangements can be employed to permit of achievement of the desired object.

What I claim is:

1. In combination with a tractor having an implement hitched thereto for raising and lowering between idle and working positions respectively, mechanism for raising and lowering said implement comprising a power driven pump continuously discharging liquid and connected into a substantially closed hydraulic circuit, hydraulic means connected to said implement and connected to be actuated by liquid pressure at the discharge side of the pump, valve means in said circuit operable between open and closed positions for respectively building up liquid pressure at the discharge side of said pump sufficient to actuate said hydraulic means to raise said implement from working position and for reducing said pressure for lowering of said implement to working position, a weight transfer valve in said circuit subject to the liquid pressure at the discharge side of said pump in reversible flow communication with said hydraulic means, means for positively and constantly holding said weight transfer valve closed throughout normal operating pressure, and control means shiftable to actuate said weight transfer valve holding means to render said weight transfer valve operable to open position under the influence of liquid pressure in said circuit when said liquid pressure attains a predetermined value which is materially less than the pressure required to actuate said hydraulic means to raise the implement, whereby said weight transfer valve in operable position maintains said pressure acting on said hydraulic means substantially at said predetermined value and a load proportional to said predetermined value of pressure and corresponding to part of the weight of said implement is transferred to the driven wheels of the tractor while the implement remains in lowered working position.

2. In combination with a tractor having an implement hitched thereto for raising and lowering between idle and working positions respectively, mechanism for raising and lowering said implement comprising a power driven pump continuously discharging liquid and connected into a substantially closed hydraulic circuit, hydraulic means connected to said implement and connected to be actuated by liquid pressure at the discharge side of the pump, valve means in said circuit operable between closed and open positions for respectively building up liquid pressure at the discharge side of said pump sufficient to actuate said hydraulic means to raise said implement from working position and for reducing said pressure for lowering of said implement to working position, a weight transfer valve operable by the liquid pressure at the discharge side of said pump in reversible flow communication with said hydraulic means, actuating means for positively and constantly rendering said weight transfer valve inoperative in closed position throughout normal operating liquid pressures, and control means shiftable to cause said actuating means to render said weight transfer valve operative to open position under the influence of liquid pressure in said circuit when said liquid pressure attains a predetermined value which is materially less than the pressure required to actuate said hydraulic means to raise the implement to maintain substantially said predetermined pressure value acting on said hydraulic means in the circuit, whereby the liquid pressure maintained by opening said weight transfer valve and acting on said hydraulic means facilitates the transfer of part of the weight of the implement to the driven wheels of the tractor while said implement remains in lowered working position.

3. In the combination defined in claim 2, said weight transfer valve being directly exposed to pressure on the discharge side of the pump and disposed to control flow of liquid in a passage between the pump discharge and a return portion of said hydraulic circuit, spring means urging said weight transfer valve to restrict said passage and said control means being connected to shift said actuating means to weaken said spring means to render said weight transfer valve operative.

4. In the combination defined in claim 2, said weight transfer valve being disposed to control flow of liquid in a passage between the pump discharge line and a return portion of said hydraulic circuit, and said actuating means comprising a valve means in said passage adapted in one position to prevent said pump discharge line pressure from acting on said weight transfer valve, and said control means being adapted to shift said valve means to directly subject said weight transfer valve to pump discharge line pressure.

5. The tractor-implement combination as defined in claim 2, wherein said control means comprises a control lever movable to a predetermined position for rendering said weight transfer valve operative and includes an adjustable stop to determine said predetermined position of said control lever.

6. The tractor-implement combination as defined in claim 2, wherein said control means comprises a control lever movable to a predetermined position for rendering said weight transfer valve operative, said lever being connected to control the operation of said valve means to raise and lower said implement.

7. A tractor-implement combination as defined in claim 6, wherein said hydraulic means comprises a hydraulic cylinder and said circuit includes a conduit connecting the cylinder to the liquid discharge of said pump, and a non-return valve in said conduit arranged to open toward said cylinder, and said valve means operated by said control lever comprises a spring-closed by-pass valve connected to said conduit between the pump and said non-return valve and a spring-closed drop valve connected to said conduit between said cylinder and non-return valve by a pipe having a restriction of predetermined cross-sectional area, and said weight transfer valve is spring-closed and connected to said conduit between said cylinder and non-return valve, said control lever being movable into four different positions, and connections between said control lever and said by-pass valve, drop valve and weight transfer valve whereby in one position of said lever all of said valves are closed, in a second position of said lever the by-pass valve is open and the drop valve and weight transfer valve are closed, in a third position of said lever the by-pass valve and drop valve are both open and the weight transfer valve is closed, and in a fourth position of said lever the by-pass valve and drop valve are closed and the weight transfer valve is open.

8. The combination as defined in claim 2, wherein said control means comprises a control lever movable to a predetermined position for rendering said weight transfer valve operative, and wherein a second lever controls operation of said valve means to raise and lower said implement and permits movement of said first mentioned lever independently thereof, said hydraulic means comprising a hydraulic cylinder, a conduit in said circuit connecting said cylinder to the liquid discharge of said pump and a non-return valve in said conduit arranged to open toward said cylinder, said valve means opened by said second control lever comprising a spring-closed by-pass valve connected to said conduit between said pump and said non-return valve and a spring-closed drop valve connected to said conduit between said cylinder and said non-return valve by a passage having a restriction of predetermined cross-sectional area, said weight transfer valve being spring-closed and connected to said conduit between said cylinder and said non-return valve, said second control lever being a raise and lower control lever which is movable into three different positions, and means connecting said by-pass and drop valves to said raise and lower control lever so that in one position of said lever both the by-pass valve and drop valve are closed, in a second position of said lever the by-pass valve is open and the drop valve is closed, and in a third position of said lever both the by-pass and drop valves are open, and said first-named control lever being a pivoted weight transfer control lever for said weight transfer valve, a pin-and-slot connection between said weight transfer control lever and said raise and lower control lever which permits said raise and lower control lever to control said means to raise and lower the implement independently of said weight transfer control lever while the latter lever is in a position in which the weight transfer valve is closed and permits movement of the weight transfer control lever to a position in which the weight transfer valve is permitted to open, and while said raise and lower control lever is in the position in which the by-pass valve and drop valve are both closed, the weight transfer control lever is movable to permit the weight transfer valve to open, and while the weight transfer control lever is in the latter position, said raise and lower control lever is movable in a direction to open the by-pass valve or both the by-pass valve and drop valve and to return the weight transfer control lever to a position in which the weight transfer valve is closed.

9. A tractor-implement combination as defined in claim 2, wherein said control means comprises a control lever movable to a predetermined position for rendering said weight transfer valve operative and wherein said hydraulic means comprises a hydraulic cylinder, and said circuit includes a valve chamber connected to the liquid discharge of said pump and having a port which leads to said cylinder and a non-return valve arranged therein to open toward the cylinder, a second port disposed on the cylinder side of said non-return valve and leading to the cylinder, and a return port, said valve means includes a valve member connected to said control lever and slidable thereby axially in said valve chamber, said valve member having ports therein for the passage therethrough of liquid from the liquid discharge of the pump, and said weight transfer valve is a spring-pressed valve member movable into a position to close the return port in the valve chamber, said slidable valve member being movable by said control lever into one position in which the port leading from the valve chamber to the non-return valve is open and the return port and the port leading to the hydraulic cylinder on the cylinder side of the non-return valve are closed, into a second position in which both of the ports leading to the hydraulic cylinder are closed and the return port is open, into a third position in which the port leading to the non-return valve is closed and return port and port leading to the hydraulic cylinder on the cylinder side of the non-return valve are open, and into a fourth position in which the port leading to the non-return valve is closed, the port leading to the hydraulic cylinder on the cylinder side of the non-return valve is open, and the return port is obstructed by said spring-pressed valve member, said spring-pressed weight transfer valve member being yieldable under pressure built up in the hydraulic cylinder which is determinedly less than that required to raise the implement from working position in the soil and movable in a direction to open said return port.

10. In a hydraulic system for use in moving an implement hitched to a tractor between raised idle positions and ground-engaging working positions and for selectively varying the load on the driving wheels of said tractor independently of the depth which said implement engages in the ground and of the draft forces established thereby, pressure actuatable hydraulic motor means connected to said implement and operative to raise and lower said implement between idle and ground-engaging positions, a liquid supply source, hydraulic pump means connected to said liquid supply source and having an outlet connection for supplying pressure liquid to operate said hydraulic means for raising said implement, a pressure liquid hydraulic circuit connecting said outlet with said hydraulic motor means, means for selectively releasing liquid pressure acting on said hydraulic motor means to permit said implement to be lowered, valve means operable under influence of liquid pressures at the upstream and downstream ends thereof and disposed in said circuit intermediate of said hydraulic pump means and said hydraulic motor means to prevent reversal of liquid flow from said hydraulic motor means to said hydraulic pump means, means in said circuit for preventing liquid pressure from exceeding a first predetermined value that is greater than the pressure required to raise said implement, weight transfer valve means in said circuit between said valve means and said hydraulic motor means and in reversible flow communication with said hydraulic motor means and said valve means, and operator-selector means for selectively holding said weight transfer valve means in closed position at liquid pressures below said first predetermined liquid pressure and for selectively permitting said weight transfer valve means to open under the influence of a second predetermined liquid pressure in said circuit that is substantially less than the liquid pressure required to raise said implement for discharging pressure liquid in said circuit between said valve means and said hydraulic motor means while said implement is in lowered working position to thereby substantially maintain said second predetermined liquid pressure acting on said hydraulic motor means so as to correspondingly transfer to the driven wheels of the tractor a load constituting part of the weight of said implement that proportionately corresponds to the magnitude of said second predetermined liquid pressure.

11. In a hydraulic pump system for use in raising and lowering an implement hitched to a tractor between idle and working positions, hydraulic motor means operably connected to said implement for raising and lowering said implement upon application of liquid pressure, hydraulic pump means connected to a liquid supply source and having a pressure liquid outlet connection, a pressure liquid hydraulic circuit connecting said outlet with said hydraulic motor means, liquid pressure operated check valve means in said circuit for controlling the reversal of flow through said circuit, said valve means in said circuit between said check valve means and said outlet in reversible flow communication with said outlet and operative in opened position for discharging pressure liquid out of said circuit to thereby reduce liquid pressure on the downstream side of said check valve means, second valve means in said circuit between said check valve means and said liquid motor means in reversible flow communication with said motor means and operative in opened position for discharging pressure liquid from said circuit thereby releasing pressure acting on said liquid motor means, weight transfer valve means in said circuit between said check valve means and said liquid motor means in reversible flow communication with said liquid motor means and operative in opened position for discharging pressure liquid from said circuit thereby releasing pressure acting on said liquid motor means, and selector means operably interlocking said first, second and weight transfer valve means to selectively maintain said first, second and weight transfer valve means closed to establish a pressure on said hydraulic motor means for raising said implement but permitting said first valve means to open under the influence of a first predetermined liquid pressure in said circuit, to selectively open said first valve means and maintain said second and weight transfer valve means closed, to selectively open said first and second valve means and maintain said weight transfer valve means closed, and to selectively maintain said first and second valve means closed but permitting said first valve means to open under the influence of said first predetermined liquid pressure in said circuit and permitting said weight transfer valve means to open under a predetermined liquid pressure in said circuit that is substantially less than the liquid pressure required to raise said implement and the liquid pressure required to open said first valve means.

References Cited in the file of this patent

UNITED STATES PATENTS

| | | |
|---|---|---|
| 2,243,364 | Trautman | May 27, 1941 |
| 2,538,143 | Brown | Jan. 16, 1951 |
| 2,611,307 | Strehlow et al. | Sept. 23, 1952 |
| 2,627,796 | Bunting | Feb. 10, 1953 |
| 2,667,745 | Smith et al. | Feb. 2, 1954 |
| 2,722,873 | Garmager | Nov. 8, 1955 |

FOREIGN PATENTS

| | | |
|---|---|---|
| 624,146 | Great Britain | May 27, 1949 |

UNITED STATES PATENT OFFICE
CERTIFICATION OF CORRECTION

Patent No. 2,958,384                                November 1, 1960

Charles H. Hull

It is hereby certified that error appears in the above numbered patent requiring correction and that the said Letters Patent should read as corrected below.

In the grant, lines 2 and 3, for "assignor to David Brown Tractors (Engineering) Limited," read -- assignor to David Brown Industries Limited, of Meltham, Huddersfield, England, a company of Great Britain, --; line 12, for "David Brown Tractors (Engineering) Limited, its successors" read -- David Brown Industries Limited, its successors --; in the heading to the printed specification, lines 4, 5 and 6, for "assignor to David Brown Tractors (Engineering) Limited" read -- assignor to David Brown Industries Limited, Meltham, Huddersfield, England, a company of Great Britain --.

Signed and sealed this 2nd day of May 1961.

(SEAL)
Attest:
ERNEST W. SWIDER
Attesting Officer

DAVID L. LADD
Commissioner of Patents

UNITED STATES PATENT OFFICE
CERTIFICATE OF CORRECTION

Patent No. 2,958,384 November 1, 1960

Charles H. Hull

It is hereby certified that error appears in the above numbered patent requiring correction and that the said Letters Patent should read as corrected below.

Column 5, lines 25 and 26, for "open and closed" read -- closed and open --.

Signed and sealed this 17th day of October 1961.

(SEAL)
Attest:

ERNEST W. SWIDER
Attesting Officer

DAVID L. LADD
Commissioner of Patents

USCOMM-DC